(No Model.)  3 Sheets—Sheet 1.

G. A. WHITMORE.
TRANSPLANTER.

No. 456,209.  Patented July 21, 1891.

WITNESSES
Arthur A. Erb.
Wellington Kugler.

INVENTOR
George A. Whitmore
By his Attorney
Frank L. Dyer (No Model.) 3 Sheets—Sheet 2.
G. A. WHITMORE.
TRANSPLANTER.
No. 456,209. Patented July 21, 1891.
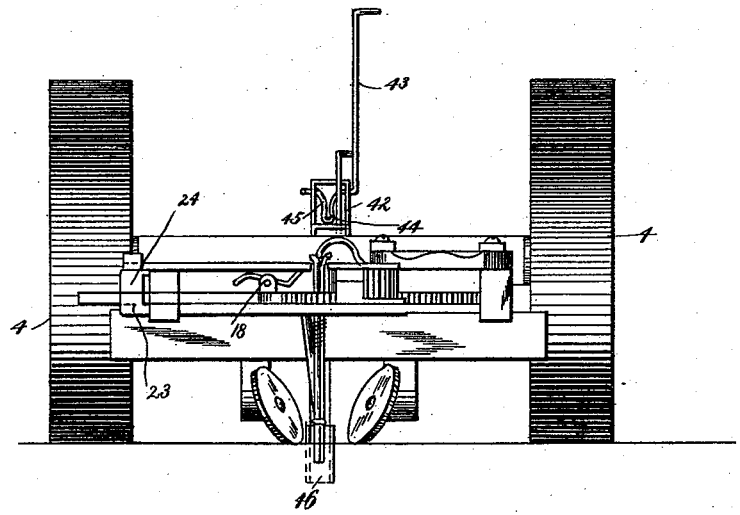
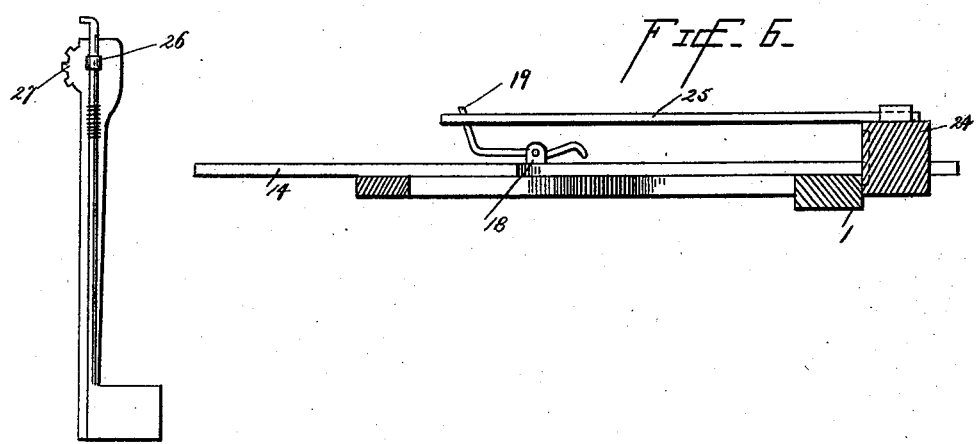

(No Model.) 3 Sheets—Sheet 3.
G. A. WHITMORE.
TRANSPLANTER.
No. 456,209. Patented July 21, 1891.
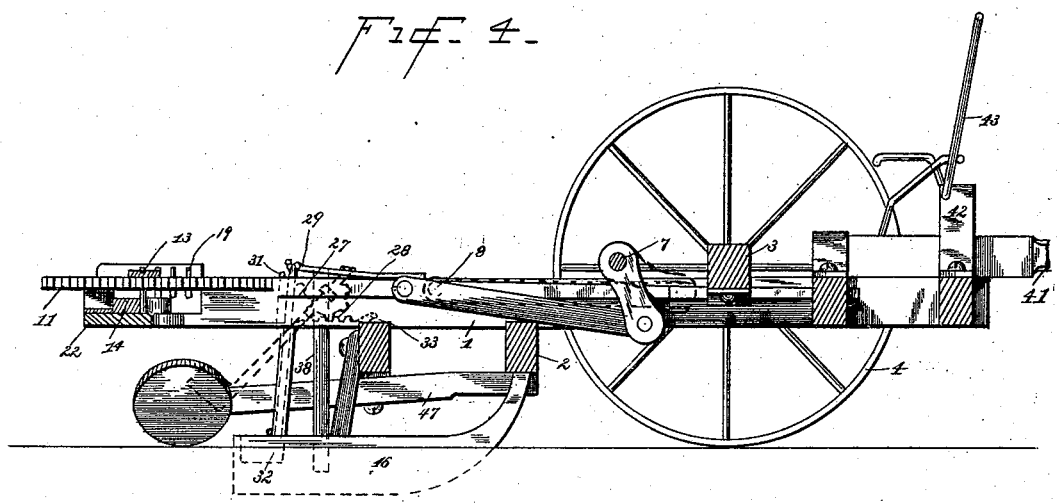
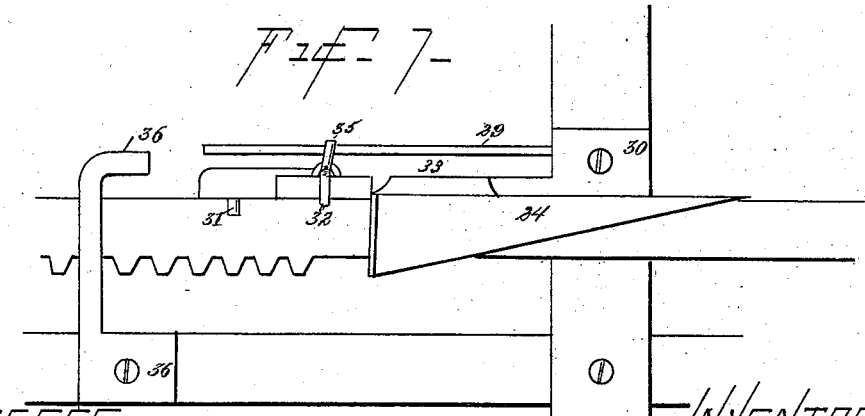
WITNESSES.
Arthur A. Erb.
Wellington Nagler.
INVENTOR.
George A. Whitmore
By his Attorney
Frank L. Dyer

UNITED STATES PATENT OFFICE.

GEORGE A. WHITMORE, OF FELLOWS, WISCONSIN.

TRANSPLANTER.

SPECIFICATION forming part of Letters Patent No. 456,209, dated July 21, 1891.

Application filed May 16, 1890. Serial No. 352,103. (No model.)

*To all whom it may concern:*

Be it known that I, GEORGE A. WHITMORE, a citizen of the United States, residing at Fellows, in the county of Rock and State of Wisconsin, have invented certain new and useful Improvements in Planting-Machines; and I do hereby declare the following to be a full, clear, and exact description of the invention, which will enable others skilled in the art to which it appertains to make and use the same.

My present invention relates to various new and useful improvements in automatic planting-machines, which are especially adapted for use in transplanting tobacco-plants, and also in planting cabbages, celery, and timber-sprouts, and any other products of a like nature.

The objects of my invention are to provide and produce a planting-machine of novel construction adapted, first, to automatically cut a furrow in the ground, then to plant one sprout at a time therein, then to water the root thereof, and finally to close up the furrow, so that each plant will remain standing, this operation being repeated during the planting of each sprout.

The principal novelties in my invention consist in providing a wheeled vehicle carrying a plow beneath the same, with a planting-arm working behind said plow and adapted to grasp the sprout and plant it in the furrow made by said plow, and also in providing the machine with a suitable watering mechanism, whereby the root of each sprout will be given a certain amount of water just after it has been placed in the furrow and before being covered, and finally in providing said vehicle with a feeding-table, whereby one sprout at a time will be fed to the planting arm to be planted, as well as in appropriate intermediate mechanism connecting with one of the drive-wheels of the vehicle to operate the various moving parts of the machine, all as will be more fully hereinafter described and claimed.

For a better comprehension of my invention attention is directed to the accompanying drawings, forming a part of this specification, and in which—

Figure 1:
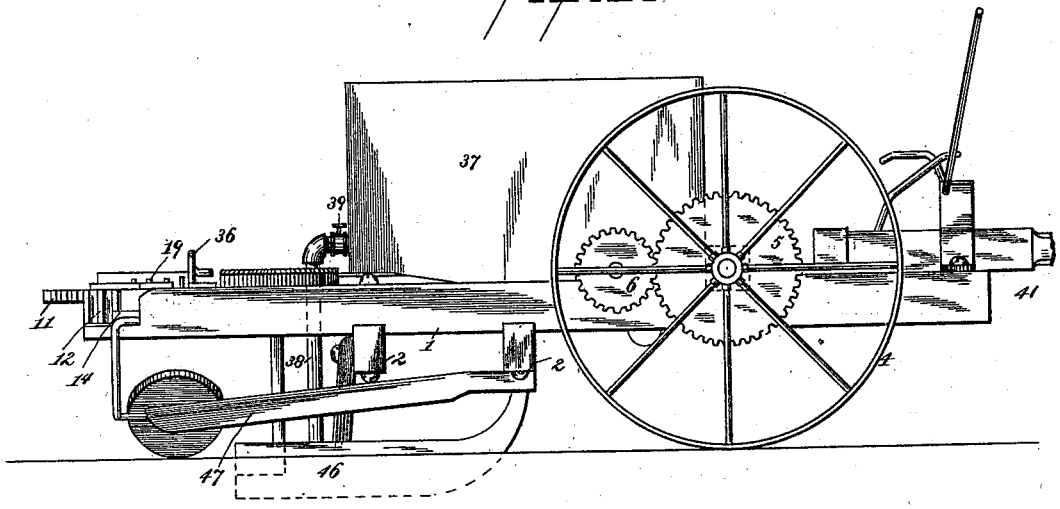
Figure 2:
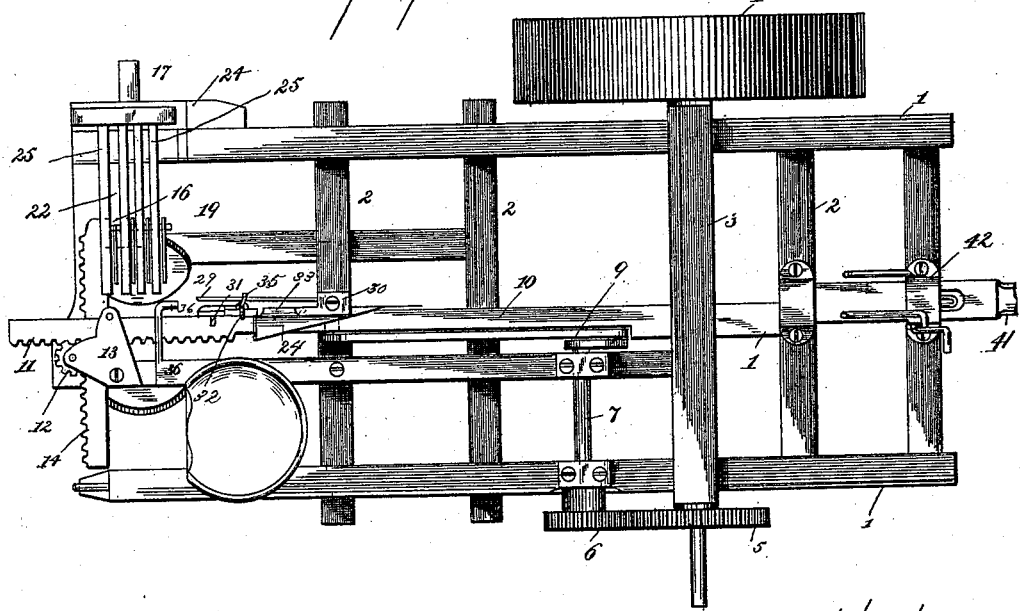

Figure 1 is a side elevation of my improved planting-machine; Fig. 2, a top elevation of the same; Fig. 3, a rear elevation; Fig. 4, a sectional view, partly in elevation, taken on the lines *x x* of Fig. 2; Fig. 5, an enlarged elevation of the planting-arm, and Fig. 6 an enlarged sectional view of the feeding table and arm; Fig. 7, an enlarged view of the planting mechanism.

In all of the above views corresponding reference characters denote the same parts in each.

1 1 1 represent the longitudinal frames of the machine; 2 2 2, the lateral frames, all constructed, preferably of wood.

Extending directly across the machine near its forward portion is the axle 3, of ordinary construction, carrying at its outer ends the two main supporting-wheels 4 4. These wheels are preferably made of metal with wide tires, so that wheels will be very strong and will not sink in soft ground or mud. Rigidly secured to one of these supporting-wheels on its exterior, preferably to the hub thereof, is a gear-wheel 5, made of metal. This gear-wheel engages with a smaller gear-wheel 6, mounted upon a short horizontal axle 7, having bearings in suitable boxes 8 8, secured to the longitudinal frames 1 1. The shaft 7 carries a pitman 8 at its outer end, which operates with the connecting-rod 9. This rod 9 connects with the main reciprocating beam 10, which is thus operated. This reciprocating beam works in suitable guides secured to the lateral frame-work. The outer end of this reciprocating beam is provided with a rack 11, which engages with and operates a small pinion 12, mounted at the extreme rear end of the machine within a suitable frame 13, which also forms a suitable guide for the reciprocating beam 10. Engaging also with this pinion 12 is a small rack-bar 14, arranged at right angles to the beam 10. The rack-bar 14 is provided at its end with a small cross-bar 16, from which extends rearwardly a guide-bar 17, working in a suitable opening in the side of the machine and by which the movement of the rack-bar 14 will be made exactly at right angles to the reciprocating bar.

The short integral arm 16 is provided with two pivoting-eyes 18 18, within which is mounted a set of rake-arms 19, adapted to fall in a lowered position by their own weight and also adapted to be raised and to be held in that position by means of a small spring 20, engaging with a slot 21, formed in the side of the pending arm 22, which is made integral with a set of rake-teeth or feeding-arm, before referred to. When these rake-teeth are in a lowered position, the depending arm 22 will be elevated above the spring 20, so that the engagement between the two will be broken.

The deflecting-arm 22 works normally in a slot or groove 23, formed in the rear support 24 of the main frame and which is slightly inclined at its forward end. When the rack-bar 14 is moved away from the reciprocating beam 10, the deflecting-arm 22 will not be affected until it comes into contact with the side of the frame at the rear of the slot 23, by which it will be thrown downwardly and the rake-teeth will be raised. When in this position, the depending arm 22 will be locked in place by the spring 20, before alluded to. As the rack-bar 14 advances toward the reciprocating beam it will travel freely in the slot 23 until the incline before referred to is reached, when it will be elevated and the rake-teeth moved downwardly, all as will be understood by any one familiar with the art to which my invention appertains.

Placed directly above the rake-teeth mounted in the side of the machine are a number of slats 25, forming the feed-table. The rake-teeth extend up between the spaces between the slats 25, so as to feed the sprouts therefrom onto the planting-arm, which will now be described. It consists of a metal arm of a shape somewhat resembling a human leg and foot. This arm is pivoted at its upper portion to an eyebolt 26, extending directly through the reciprocating bar 10, and with the eye extending on the outside of the arm 25, so as to form a continual guide for the shank or finger or clutch-arm, to be described hereinafter.

The upper forward end of the planting-arm 25 is provided with a parti-circular rack 27, adapted to engage at certain intervals with a rack-bar 28, rigidly secured to one of the cross-frames 2. By this means it will be seen that when the reciprocating shaft or beam 10 is moved forward the planting-arm will be advanced toward the rack 28 in an upright position until the rack is reached, after which the planting-arm will be swung gradually upward until it assumes approximately a horizontal position by reason of the rack portion thereof engaging with the bar 28, as will be evident.

A finger or clutch-arm, before referred to, is pivoted to the planting-arm 25 within the eyebolt, and also within a suitable guide near the lower end of the planting-arm. The finger or clutch-arm is provided with a foot corresponding exactly with the foot of the planter-arm. The foot of the finger or clutch-arm is held normally against the foot of the planting-arm by means of a small coil-spring connecting the two. Pivoted adjacent to the reciprocating beam 10, a short distance in advance of the planting-arm, is a cam-arm (in lieu of a better expression) 29. This cam-arm is provided at its rear end with a shoulder 30, adapted to engage with the upper tooth of the rack portion of the planting-arm, so as to keep the latter from swinging rearwardly when the two are engaged with each other. The planting-arm is held from movement in the opposite direction by means of a small stud or pin 31 engaging with the top of the reciprocating beam 10. The planting-arm is provided at its upper portion with a foot 32 of the general form shown. This foot trails on the upper edge of the rack-arm 24 when the reciprocating beam is moved back and forth. This rack-arm 24 is provided near its rear end with a circular cam portion 33, which will cause the depending arm 32 to be elevated when it passes over said cam portion. This will raise the planting-arm slightly, so as to disengage the same from the rack portion of the planting-arm, in order that the said planting-arm may be allowed to swing rearwardly, so that its foot may be brought up adjacent to the feeding-table. The extreme forward end of the cam-arm is raised slightly, so as to form an incline portion on its under side. The side of the cam-arm is inclined, as shown, for the purpose to be presently described. The extreme upper end of the shank or finger-arm is provided with a cross-head of a general right-angular shape, and consisting of the two short extensions 34 and 35. The extension 34 is adapted to engage with the incline portion 33 of the cam-arm as the finger-arm is being raised to a horizontal position, so as to give the shank of the finger-arm a partial rotary movement and separate the foot of the finger-arm from the foot of the planting-arm. The other extension 35 is adapted to engage, when the planting-arm is being moved toward the rear of the machine, with an extension 36, extending out upon one of the longitudinal frames 1. These two elements coming in contact with each other will also partially rotate the shank of the finger-arm, and the foot thereof will be separated from the foot of the planting-arm. Mounted upon the main frame of the machine, preferably over the axle 3, is a tank 37 for holding water. Pivoted to one of the cross-pieces of the machine is a nozzle 38, arranged directly adjacent to the rack-bar for operating the planting-arm. This nozzle connects with the tank by means of a conducting-pipe 39. A suitable valve 40 is interposed in this pipe, so as to be under the control of the dropper, so that the water may be prevented from flowing from the tank or allowed to flow therefrom. This is the simplest form of watering arrangement, and may be used advantageously under certain conditions. In this form a continuous stream of water may be permitted to flow into the furrow, or it may be allowed to flow intermittently therein as each sprout is planted by proper manipulation of the controlling-valve. It will be evident, however, that this may be done automatically by carrying the nozzle upon the reciprocating beam and causing the stem of the controlling-valve to come in contact with a stationary lug or stud placed upon the stationary frame-work, so that the valve will be opened automatically at the proper instant. The dropper sits upon a suitable seat placed upon the main frame of the machine adjacent to the planting-arm, so that these parts will be always under his scrutiny.

The machine is to be pulled along, preferably, by a pair of horses, which are to be hitched on each side of a pole 41. This pole is pivoted at its rear end to one of the lateral frames 2 beneath a $\bigwedge$-shaped metal support. A similarly-constructed but longer support 42 is secured to the extreme forward cross-piece 2 and surrounds the pole. Pivoted within this support 42 is an operating-handle 43, having an integral arm 44 working within said support. This arm connects with the pole by means of a small link 45. By this means the pole may be made to extend out horizontally parallel with the longitudinal frame 1 1, or the operating-lever may be thrown backward, so as to elevate the rear of the machine, since the pole is practically immovable. The plow 46 is secured beneath the machine so as to be very strong and rigid. The width of this plow is comparatively slight, since it is intended to cut a very narrow furrow. This plow is made preferably of iron, and rear end thereof is double flanged or winged, as shown. These wings or flanges are far enough apart to allow the planter-arm and the sprout to pass between the same. Extending down from the bottom of the machine is an inclined frame-work 47, made preferably of wood. Pivoted to the ends of this frame-work are two covering-wheels arranged at an acute angle to each other, so as to converge together. These covering-wheels are arranged to close up around the furrow, so as to cover the same around the plants. It is advisable to connect the smaller gear-wheel 6 with the shaft 7 by means of a suitable clutch, so that the two may be disconnected in order that the machine may be driven to or away from the field without going through the operation of planting.

The operation of my improved machine is substantially as follows: The wheel 4 in rotating will cause the reciprocating shaft 10 to be moved back and forth through the instrumentality of the gear-wheels and the connecting-rod 9. This will cause the feeding apparatus to be moved, as was described before. It will be remembered that the rake-teeth are raised above the feeding-table in advancing toward the center of the machine; but in moving in the opposite direction they are forced entirely beneath the feeding-table. By this means when the sprouts are placed successively one by one upon the feeding-table they will be fed by the rake-teeth from off the same between the two feet of the planting-arm and finger-arm, which will be assuming a horizontal position, owing to the engagement between the teeth thereon and the rack-bar. As the finger-arm advances toward this horizontal position the extensions 35 at the top of its shank will be in engagement with the incline 34 of the cam-arm, and the two feet of the finger and planting arms, respectively, will be separated. These two arms will be held in this separated position until the sprout from the feeding-table will be dropped between them, at which instant the projection 35 will have passed below the incline 34, and the coil-spring around the shank of the finger-arm will then throw the two feet together, so as to tightly grasp the sprout. By this time the reciprocating rod 10 will commence to move backwardly and the planting-arm will be quickly swung to its original vertical position, so that the sprout will be placed in the furrow between the wings or the flanges of the plow before described. When the planting-arm has reached this position, the reciprocating rod continues to move toward the back of the machine and will carry the planting-arm with it. It will be understood, however, that the machine moves forward at precisely the same rate of speed that the planting-arm moves backward, so that the relation of the sprout with the furrow remains unchanged. In fact, the sprout will be held perfectly stationary in the furrow by the planting and finger arms until the covering-fingers have passed up adjacent to it and have piled the dirt from the furrow around it. By this time the projection 36 will have come into contact with the stanchion 37, and the two feet will be separated, so as to release the scrub, which will be left standing entirely covered and in an upright position. The planting-arm now returns toward the front of the machine until it comes into engagement with the rack-bar, when it will be elevated and the operation will be repeated. The watering of the sprout may be by any of the methods before described; but it is perfectly automatic.

Having now described my invention, what I claim as new therein, and desire to secure by Letters Patent, is as follows:

1. In a planting-machine, the combination of a frame-work, supporting-wheels for the frame-work, a reciprocating beam working in said frame-work and deriving movement from one or more of said supporting-wheels, a planting-arm pivotally mounted on said beam and having a segmental upper portion whereby it is given a rotary movement, and feeding mechanism, substantially as described.

2. In a planting-machine, the combination of a frame-work, supporting-wheels therefor, a tank mounted on the frame-work connected with a nozzle arranged substantially as herein described, a plow beneath the frame and covering-wheels in the rear of the plow, planting and finger arms connected together, and feeding apparatus for feeding sprouts successively to said planting and finger arms.

3. The combination, with feeding mechanism consisting of a slatted table having rake-teeth adjacent thereto and adapted to be advanced in a raised position and retracted in a lowered position, of a planting-arm constructed and arranged substantially as herein set forth.

GEORGE A. WHITMORE.

Witnesses:
C. ROSA,
WM. KUDZ.